United States Patent [19]

Simms et al.

[11] 3,757,114
[45] Sept. 4, 1973

[54] APPARATUS AND METHOD FOR MEASURING THE INTENSITY OF A BEAM OF NEUTRAL ATOMS OR MOLECULES

[75] Inventors: Douglas Leon Simms, East Orange; Norman Henry Tolk, Mendham; Clark Woody White, Dover, all of N.J.

[73] Assignee: Bell Telephone Laboratories, Incorporated, Murray Hill, Berkeley Heights, N.J.

[22] Filed: Mar. 8, 1972

[21] Appl. No.: 232,864

[52] U.S. Cl............................250/251, 250/71.5 R
[51] Int. Cl.............................................. G01t 1/20
[58] Field of Search....................... 250/41.3, 71.5 R

[56] References Cited
OTHER PUBLICATIONS
"A Quantitative Detector for Neutral Particles" Barnett Review of Scientific Instruments, Vol. 43, No. 2, Feb. 1972 pp. 218-224

*Primary Examiner*—James W. Lawrence
*Assistant Examiner*—C. E. Church
*Attorney*—R. J. Guenther

[57] ABSTRACT

The intensity of a beam of neutral particles traveling at velocities of up to $3.4 \times 10^7$ cm/sec may be monitored by inserting a precalibrated target in the path of the beam, and measuring the intensity of photon emissions which result from collision of the particles with the target. The intensity of the beam is related to the intensity of the photon emissions by the calibration factor of the target material. The invention may be used, for example, in conjunction with neutral particle implantation techniques.

4 Claims, 1 Drawing Figure

PATENTED SEP 4 1973    3,757,114
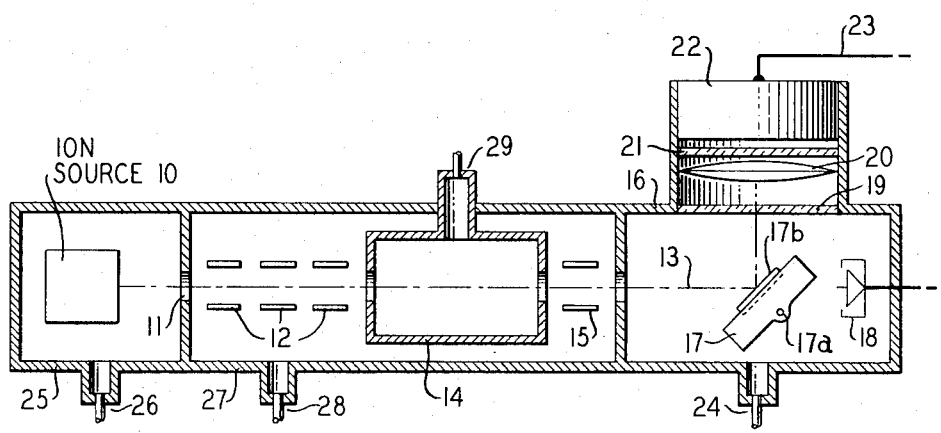

APPARATUS AND METHOD FOR MEASURING THE INTENSITY OF A BEAM OF NEUTRAL ATOMS OR MOLECULES

BACKGROUND OF THE INVENTION

1. Field of the Invention

This invention relates to a measuring technique, and more particularly to apparatus and a method for measuring the intensity of neutral particles.

2. Prior Art

Research concerned with neutral particles of atoms or molecules has been hampered by the lack of a particle intensity measuring technique which is both reliable and convenient. One method for measuring such intensities uses a standard bolometer, and involves first measuring the intensity of a beam of charged particles of the same species as the neutral particles to be measured. The charged particle beam of known intensity is then directed against the delicate metal foil of the bolometer, and the change in temperature of the foil is measured. Subsequent impingement of a neutral particle beam of the same energy and species yields a temperature change whose ratio to the temperature change caused by the calibrating beam is proportional to the ratio of beam intensities. This method often tends to be time-consuming (several hours are often required to bring the system to equilibration) and tedious (the foil must be very delicate in order to get a readily measurable temperature change, particularly for beams of low intensity or low particle density, and the foil mounts and leads should be designed so as to minimize loss of heat from the foil). Where commercial use of neutral particle beams is contemplated, such as for implantation techniques in integrated circuit manufacture, as described and claimed in copending U.S. application, Ser. No. 232,771, filed Mar. 8, 1972, assigned to the present assignee, the desire for rapid intermittent or continuous monitoring of beam intensity renders the temperature change method an impractical candidate.

SUMMARY OF THE INVENTION

Measuring the intensity, i.e., the number of particles passing through a unit area per unit of time, of neutral particles is enabled by the discovery that in certain cases the intensity of photon emissions which result from the collision of particles of the same species having low to moderate velocity with a solid surface is proportional to the intensity of the particles, regardless of whether the particles are charged or neutral. Thus, knowing the intensity of a charged particle beam enables the calibration of a suitable solid as a target material by observing the intensity of photon emissions from excited state atoms sputtered from the surface by the particle beam. Subsequent collision of a neutral particle beam of the same species but of unknown intensity with the target surface, under conditions which insure substantially the same efficiency for production of excited state atoms, results in photon emissions whose ratio to the photon emissions caused by the calibrating beam is proportional to the ratio of beam intensities.

Upon determination of the intensity of the neutral particle beam, variations in such intensity may be continuously or intermittently monitored simply by observing the variation in photon emission intensity, which is directly proportional thereto. In addition, this proportionality exists regardless of whether the solid surface is one suitable for use in the initial calibration. Thus, "real-time" monitoring of neutral beam intensity variations upon any solid surface is possible, and may be significant, in certain commercial applications, such as integrated circuit manufacture by neutral beam implantation techniques, where the substrate is of a material not ordinarily suitable for use as a primary target material.

BRIEF DESCRIPTION OF THE DRAWING

The FIGURE is a sectional view of one embodiment of an apparatus of the invention.

DETAILED DESCRIPTION

The conditions necessary for the production of photon emissions by sputtering of excited state particles from a solid surface have been previously described in U.S. Pat. No. 3,644,044, filed May 20, 1970. Briefly, the energy of collision of the incoming particles with the surface is in general sufficient to produce such excited state particles if it is at least 3 to 5 electron volts in excess of the energy defined by the relationship $$E = E_s + (M_1 + M_2/M_2) E^* \tag{1}$$

where $M$ is the mass of the incident ion or molecule, $M_2$ is the mass of the sputtered atom, $E_s$ is the threshold energy for the sputtering of surface atoms in their electronic ground states, and $E^*$ is the excitation energy of a specific excited state of the sputtered atom.

Any solid surface may yield excited state particles under such conditions. However, where a surface having a low value of electrical conductivity is bombarded with charged particles, use of a conductive grid a short distance away from the surface may be desired in order to avoid significant charge buildup on the surface, which charge would of course tend to repel incoming ions. Alternatively, the charged particle beam could be replaced by a neutral particle beam.

The beam intensity must be sufficient to provide the minimum number of collisions per unit of time to allow detection of any photon emissions which result, and is thus determined by the intensity of the photon emissions and the sensitivity of the detection means. When using single photon counting techniques, the number of collisions per unit of time may be as low as $10^4$ per second. Other detection means, listed in order of decreasing sensitivity, include d.c. measurements from conventional photomultiplier tubes, photodiodes and solar cells.

The gas pressure in the target chamber must be sufficiently low such that the intensity of photon emissions from sources other than the target surface is negligible in comparison to the spectral emission peaks of interest. In general, a pressure of about $1 \times 10^{-4}$ Torr or less will be required, while a pressure of about $5 \times 10^{-6}$ Torr or less is preferred, based upon these considerations.

As already stated, the invention relies upon the discovery that under certain conditions, the intensity of photon emissions from certain sputtered excited state particles is proportional to the intensity of the incoming particle beam, regardless of whether that beam is composed of charged or neutral particles of the same species. Although not relied upon to define the invention, this observed relationship is felt to be due to the fact that incoming charged particles are neutralized at points several Angstroms from the surface. Thus, the particles impact on the surface as neutrals, so that photon production efficiency should be the same for a charged particle beam and a neutral particle beam.

In the case of positively charged particles, in order for such neutralization to occur prior to impact, the ionization potential of the particles to be neutralized must exceed the work function of the target material under the conditions of impact. Such conditions are ordinarily satisfied for any particle species impacting upon any metal and certain non-metal surfaces, except that the Group IA alkali metals in general have ionization potentials which do not exceed the work function of most target materials at room temperature, and are thus usually unsuitable for use in the invention.

It is, of course, essential that any variation in photon emission intensities be due to variations in beam intensity and not due to variations in the amount of target material. Thus, it is preferred to maintain the target surface substantially free of impurity species; so as to minimize the possibility of a decrease in intensity of photon emissions due to loss of such species by sputtering during measurement.

The velocity of positively charged particles should in general not exceed a level which would permit substantial neutralization prior to impact with the surface. A velocity of up to $3.4 \times 10^7$ cm/sec will in general result in at least 99.9 percent of the charged particles being neutralized prior to impact.

Table I sets forth corresponding energies in electron volts for a velocity of $3.4 \times 10^7$ cm/sec for some typical beam particle species.

TABLE I

| Species | eV |
|---|---|
| H | 578 |
| $H_2$ | 1156 |
| He | 2312 |
| Ne | 11,560 |
| Ar | 23,120 |
| $N_2$ | 16,180 |
| Kr | 48,550 |
| Xe | 75,600 |

In addition to the above conditions, it is also necessary to the successful practice of the invention that the excitation efficiency for the production of sputtered excited state particles be substantially the same for both the charged particle and neutral particle beams. In general, this may be achieved by maintaining substantially the same angle of incidence and energy for both beams. These conditions are readily met in a preferred embodiment in which the neutral beam is formed by charge exchange with a neutral gas. Such charge exchange ordinarily involves little momentum transfer and thus has a negligible effect upon the energy and path of the particles, so that the neutral beam results in substantially the same excitation efficiencies as does the ion beam. A more complete description of charge exchange may be found in copending U. S. application Ser. No. 225,414, filed Feb. 11, 1972, assigned to the present assignee.

Referring now to the FIGURE, there is shown another embodiment of the apparatus in which ion beam source 10 provides ions, aperture 11 collects the ions, ion lens 12 accelerates the ions to the proper energy while also focusing the ions into an ion beam 13 and directing the beam through charge exchange chamber 14 and beam deflector 15 into collision chamber 16 containing target support 17, pivotally mounted on rod 17a and holding target 17b within a recessed portion, and containing Faraday cup 18. The target is positioned within the path of the ion beam. Photons emitted as a result of the collisions pass through quartz window 19, quartz lens 20 and narrow band transmission filter 21 to a photomultiplier tube 22. The electrical signals produced by the impact of photons on the photomultiplier tube are conducted through leads 23 to conventional signal processing equipment not shown where the counting rate is determined and registered. Due to the fact that photon emissions from the sputtered particles originate within a continuous space from the sample surface to some distance away from it, typically 0.01–0.5 cm at these energies, the position of the detection equipment is not critical. Chamber 16 may be evacuated through port 24, while chambers 25 and 27 may be evacuated through ports 26 and 28. The charge exchange gas is introduced through port 29.

The first step of the technique involves determining the intensity of the ion beam. This may be by any suitable technique, such as use of the Faraday cup 18. The next step is target calibration, in which the target is inserted into the beam path and photon emission intensity measured. The calibration factor of the target is then equal to:

$$I_{ion}/I_p \quad (2)$$

where $I_{ion}$ is the intensity of the ion beam and $I_p$ is the intensity of the photon emissions detected.

A beam of neutrals may then be formed by admitting charge exchange gas into chamber 14 via port 29, and its intensity determined by measuring the intensity of photon emissions. The intensity of the neutral beam $I_n$ is then equal to the intensity of photon emissions detected, $I_p$, times the calibration factor, or $$I_p [I_{ion}/I_p] \quad (3)$$

Depending upon the conditions of charge exchange, less than 100 percent of the charged particles may be converted to neutrals. The unneutralized particles are then deflected from the beam path by deflecting plates 15.

Once the intensity of the neutral beam has been determined, the variation in intensity may be monitored simply by observing the variation in photon emission intensity, which is directly proportional thereto. Thus, target 16 may be replaced by a material whose work function is not suitable for the initial calibration. This could be significant, for example, in the doping of semiconductor bodies by implantation, where a neutral beam is the implanting beam.

EXAMPLE

Using an apparatus similar to that shown in the FIGURE, the intensity of a beam of Ar° was determined as follows: A beam of Ar⁺ having an energy of 3 kilovolts was determined to have an intensity of $7 \times 10^{-7}$ amperes using a Faraday cup. The beam was then directed against a nickel target to produce photon emissions. Emissions at 3520 A were discriminated by a monochromator having 2000 micron slits and the photon count rate was determined to be 4640 counts/second. Argon gas was then introduced into the charge exchange chamber and the portion of the beam which was not neutralized was deflected out. The photon count rate for the resultant neutral beam was then determined to be 950 counts/second. The neutral beam intensity was then determined by equation (3) to be 1.435 × 10⁻⁷ equivalent neutral current. As a check upon the method, the intensity of the ion beam after passing through the charge exchange gas was determined and subtracted from the original ion beam intensity to give a neutral beam intensity of 1.4 × 10⁻⁷ amperes. The discrepancy of about 2.5 percent is within the limits of experimental error.

While the gaseous particles have been described as forming a beam, it will be appreciated that the particle distribution in the sample chamber may be such that a "beam" is not differentiable in the ordinary sense, and yet sufficient collisions be obtained to allow the practice of the invention.

What is claimed is:

1. A method for measuring the intensity of a beam of neutral particles comprising measuring the intensity of a beam of ions of the same species as the neutral particles, producing collisions of the ion beam with a solid target surface at an energy sufficient to result in sputtering of excited state particles from the surface, and consequent photon emissions from the sputtered particles, the target surface consisting of a material whose work function is less than the ionization potential of the ions, detecting the intensities of at least a portion of the photon emissions, producing collisions of the neutral beam with the target surface at the same angle of incidence and energy as the ion beam collisions, so as to result in photon emissions, and detecting the intensities of at least a portion of the photon emissions, the intensity of the neutral particle beam being indicated by the relationship $$I_p \ [I_{ion}/I_p \ ]$$

where $I_p$ and $I_p$ are the intensities of the photon emissions produced by the neutral particle beam, and the ion beam, respectively, and $I_{ion}$ is the intensity of the ion beam.

2. The method of claim 1 in which the beam energies are from 3 to 5 electron volts in excess of the energy defined by the relationship $$E = E_s + (M_1 + M_2/M_2) \ E^*$$

where $M_1$ is the mass of the incident ion or neutral particle, $M_2$ is the mass of the sputtered particle, $E_s$ is the threshold energy for the sputtering of surface particles in their electronic ground states, and $E^*$ is the excitation energy of a specific excited state of the sputtered particle.

3. The method of claim 1 in which the neutral beam is formed by passing the ion beam through a neutral particle gas, so as to neutralize at least a portion of the ion beam particles by charge exchange with the gas particles, and by deflecting the unneutralized particles from the beam following charge exchange.

4. The method of claim 1 in which the neutral particle gas is of the same species as the ion beam.

* * * * *

UNITED STATES PATENT OFFICE
CERTIFICATE OF CORRECTION

Patent No. 3,757,114       Dated September 4, 1973

Inventor(s) Douglas L. Simms, Clark W. White, Norman H. Tolk

It is certified that error appears in the above-identified patent and that said Letters Patent are hereby corrected as shown below:

Column 4, Equation (2) reading "$I_{ion}/I_p$" should read $-- \dfrac{I_{ion}}{I_{p_{ion}}} --$; column 4, line 30 "$I_p$" should read $-- I_{p_{ion}} --$; column 4, line 37 "$I_p$" should read $-- I_{p_n} --$; column 4, Equation (3) reading "$I_p[I_{ion}/I_p]$" should read $-- I_{p_n}\left[\dfrac{I_{ion}}{I_{p_{ion}}}\right] --$.

Column 6, line 7, the equation reading "$I_p[I_{ion}/I_p]$" should read $-- I_{p_n}\left[\dfrac{I_{ion}}{I_{p_{ion}}}\right] --$; column 6, line 10, "$I_p$", first occurrence, should read $-- I_{p_n} --$, and "$I_p$", second occurrence, should read $-- I_{p_{ion}} --$.

Signed and sealed this 1st day of January 1974.

(SEAL)
Attest:

EDWARD M. FLETCHER, JR.
Attesting Officer

RENE D. TEGTMEYER
Acting Commissioner of Patents